(12) United States Patent
Fernandez et al.

(10) Patent No.: US 12,391,373 B2
(45) Date of Patent: Aug. 19, 2025

(54) SPEED REDUCER FOR A DEVICE FOR DRIVING A WHEEL OF AN AIRCRAFT LANDING GEAR

(71) Applicant: SAFRAN TRANSMISSION SYSTEMS, Colombes (FR)

(72) Inventors: Maxime Fernandez, Moissy-Cramayel (FR); Loic Francois, Moissy-Cramayel (FR); Boris Pierre Marcel Morelli, Moissy-Cramayel (FR); Jordane Emile Andre Peltier, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 182 days.

(21) Appl. No.: 18/466,330

(22) Filed: Sep. 13, 2023

(65) Prior Publication Data
US 2024/0092479 A1 Mar. 21, 2024

(30) Foreign Application Priority Data
Sep. 16, 2022 (FR) .................................. FR2209339

(51) Int. Cl.
*B60K 17/04* (2006.01)
*B60B 27/00* (2006.01)
(Continued)

(52) U.S. Cl.
CPC ........ *B64C 25/405* (2013.01); *B60B 27/0015* (2013.01); *B60B 27/0047* (2013.01);
(Continued)

(58) Field of Classification Search
CPC ...... F16H 1/46; F16H 3/663; F16H 2200/202; F16H 2200/2097; B64C 25/405; B60K 7/0007; B60K 17/046
See application file for complete search history.

(56) References Cited

U.S. PATENT DOCUMENTS

| 3,711,043 A | 1/1973 | Cameron |
| 2005/0130792 A1 * | 6/2005 | Drago ..................... B64C 27/12 475/331 |

(Continued)

FOREIGN PATENT DOCUMENTS

| DE | 102018222005 A1 * | 6/2020 | ........... B60K 7/0007 |
| EP | 3599391 A1 * | 1/2020 | ............... F16H 1/28 |

(Continued)

OTHER PUBLICATIONS

Preliminary Research Report received for French Application No. 2209339, mailed on Apr. 17, 2023, 5 pages (1 page of French Translation Cover Sheet and 4 pages of original document).

*Primary Examiner* — Tinh Dang
(74) *Attorney, Agent, or Firm* — WOMBLE BOND DICKINSON (US) LLP

(57) ABSTRACT

A mechanical speed reducer, in particular for a device for driving at least one wheel of an aircraft landing gear, this reducer including a first sun gear including external toothing, first planet gears meshed with the external toothing of the first sun gear, these first planet gears being carried by a first planet carrier, a stationary ring gear meshed with the planet gears, and second planet gears meshed with a ring gear and with an external toothing of said first planet carrier, these second planet gears being carried by a second planet carrier.

8 Claims, 9 Drawing Sheets

(51) Int. Cl.
- *B60K 7/00* (2006.01)
- *B64C 25/32* (2006.01)
- *F16H 1/46* (2006.01)
- *F16H 3/66* (2006.01)

(52) U.S. Cl.
CPC ............ *B60K 7/0007* (2013.01); *F16H 1/46* (2013.01); *B60K 17/046* (2013.01); *F16H 3/663* (2013.01); *F16H 2200/202* (2013.01); *F16H 2200/2097* (2013.01)

(56) References Cited

U.S. PATENT DOCUMENTS

| | | |
|---|---|---|
| 2017/0113788 A1 | 4/2017 | Essinger et al. |
| 2017/0198786 A1* | 7/2017 | Chhuor .................... F16H 1/46 |
| 2019/0191575 A1 | 6/2019 | Lavergne |
| 2019/0291575 A1 | 9/2019 | Rotenberg |

FOREIGN PATENT DOCUMENTS

| | | | | |
|---|---|---|---|---|
| EP | 3882136 A1 | 9/2021 | | |
| FR | 3022858 A1 | 1/2016 | | |
| GB | 2562246 A | * 11/2018 | ............. | F01D 15/12 |

\* cited by examiner

[Fig.1]
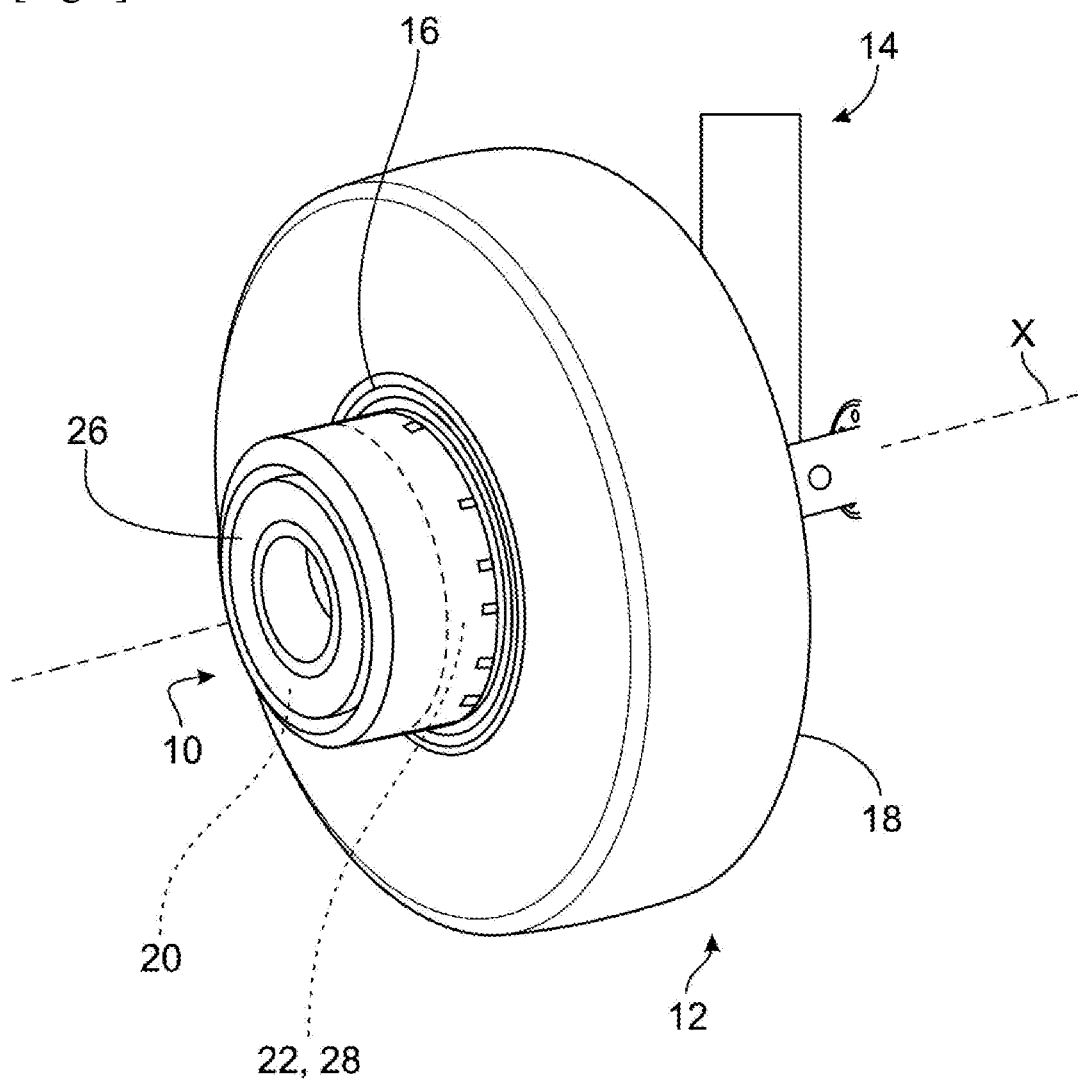

[Fig.2]
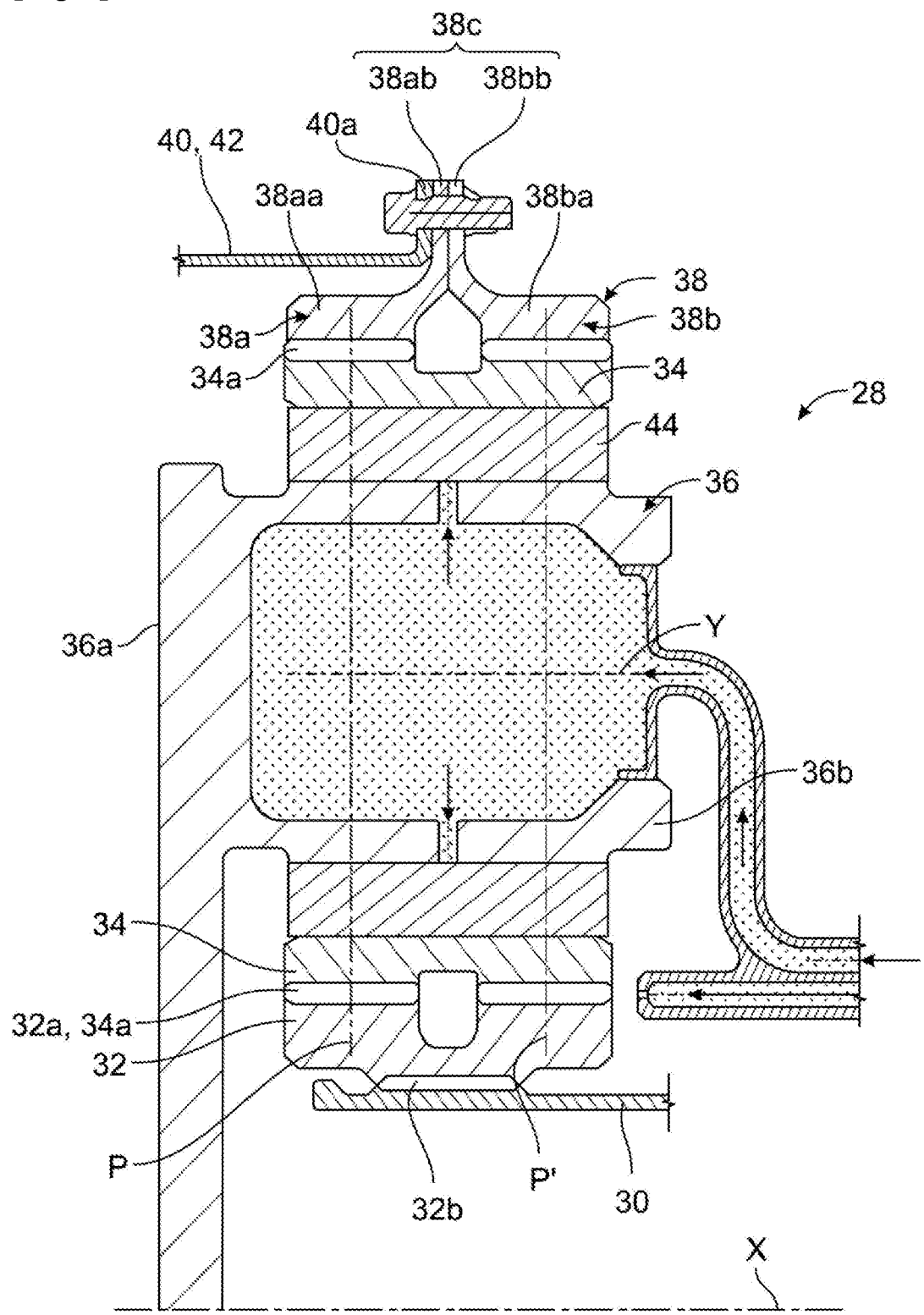

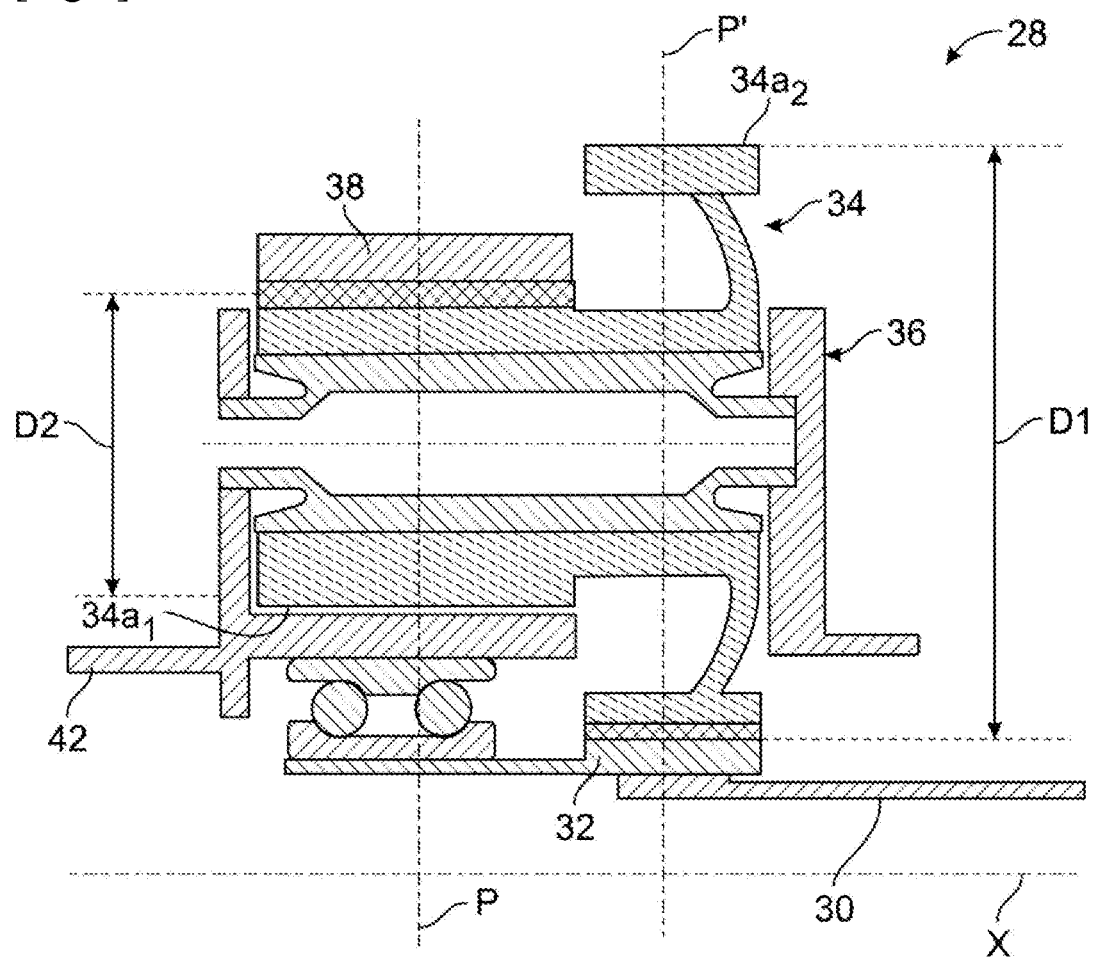
[Fig.3]

[Fig.4]
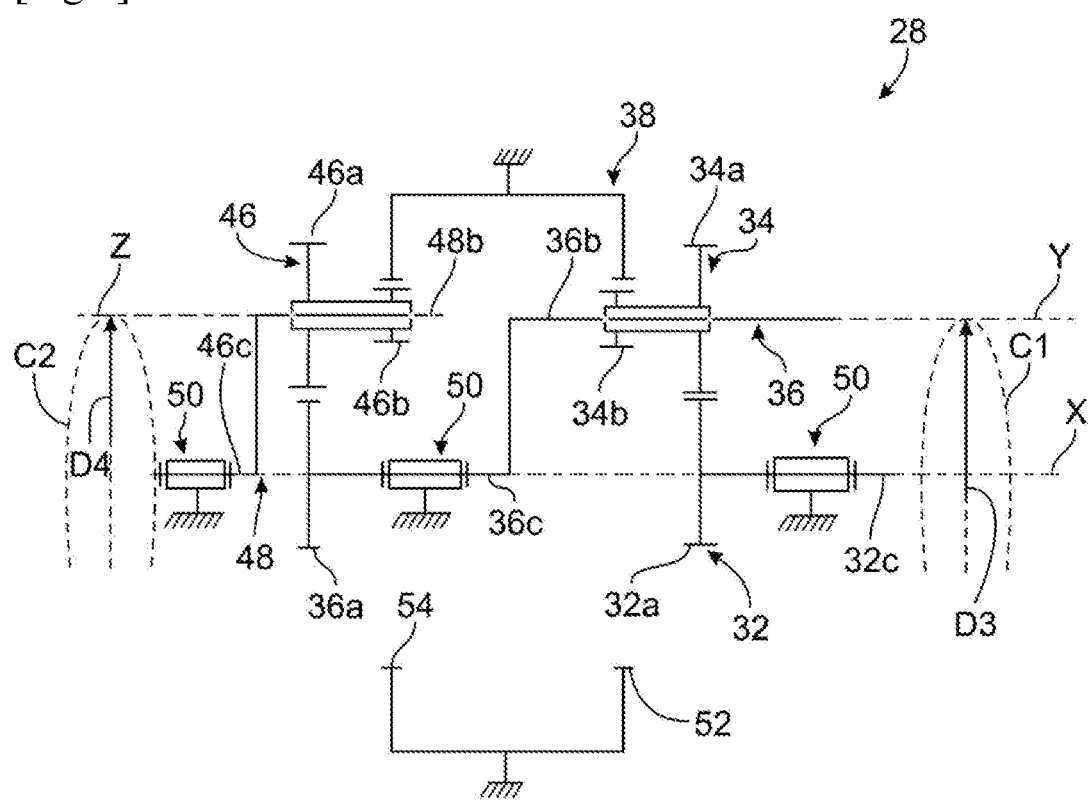

[Fig.5]
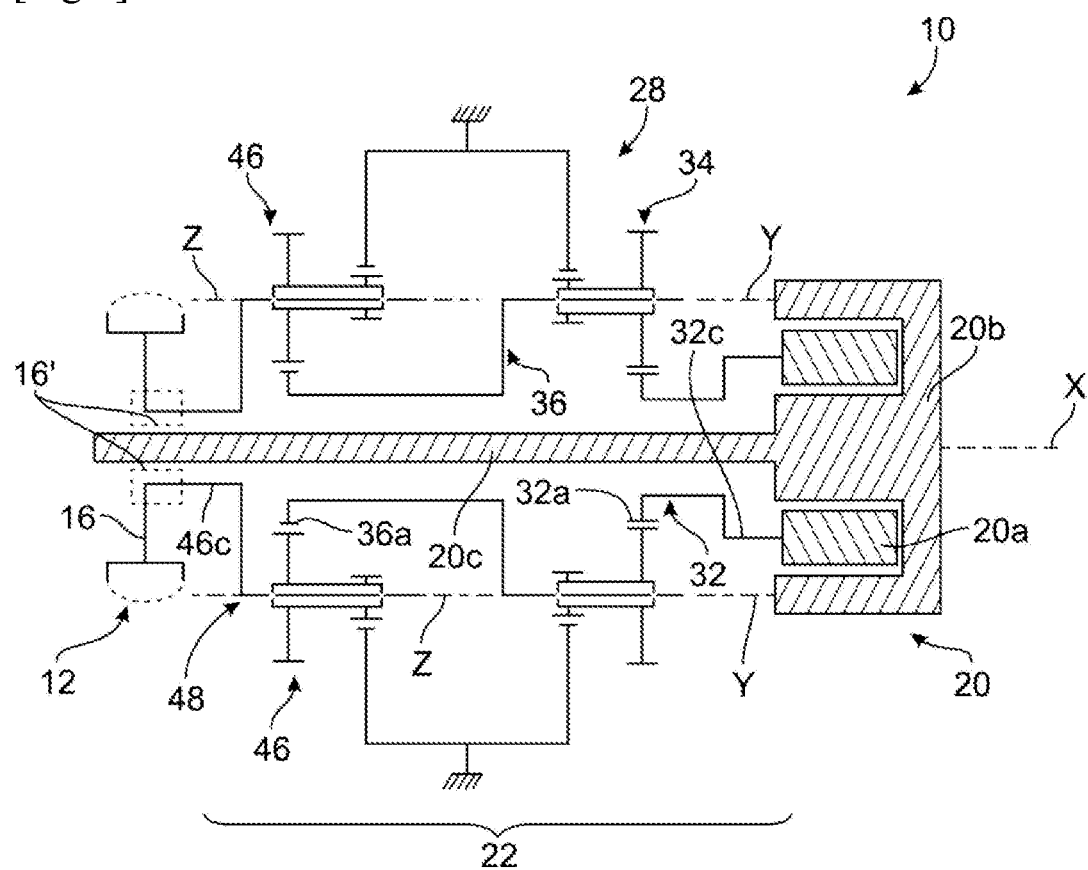

[Fig.6]
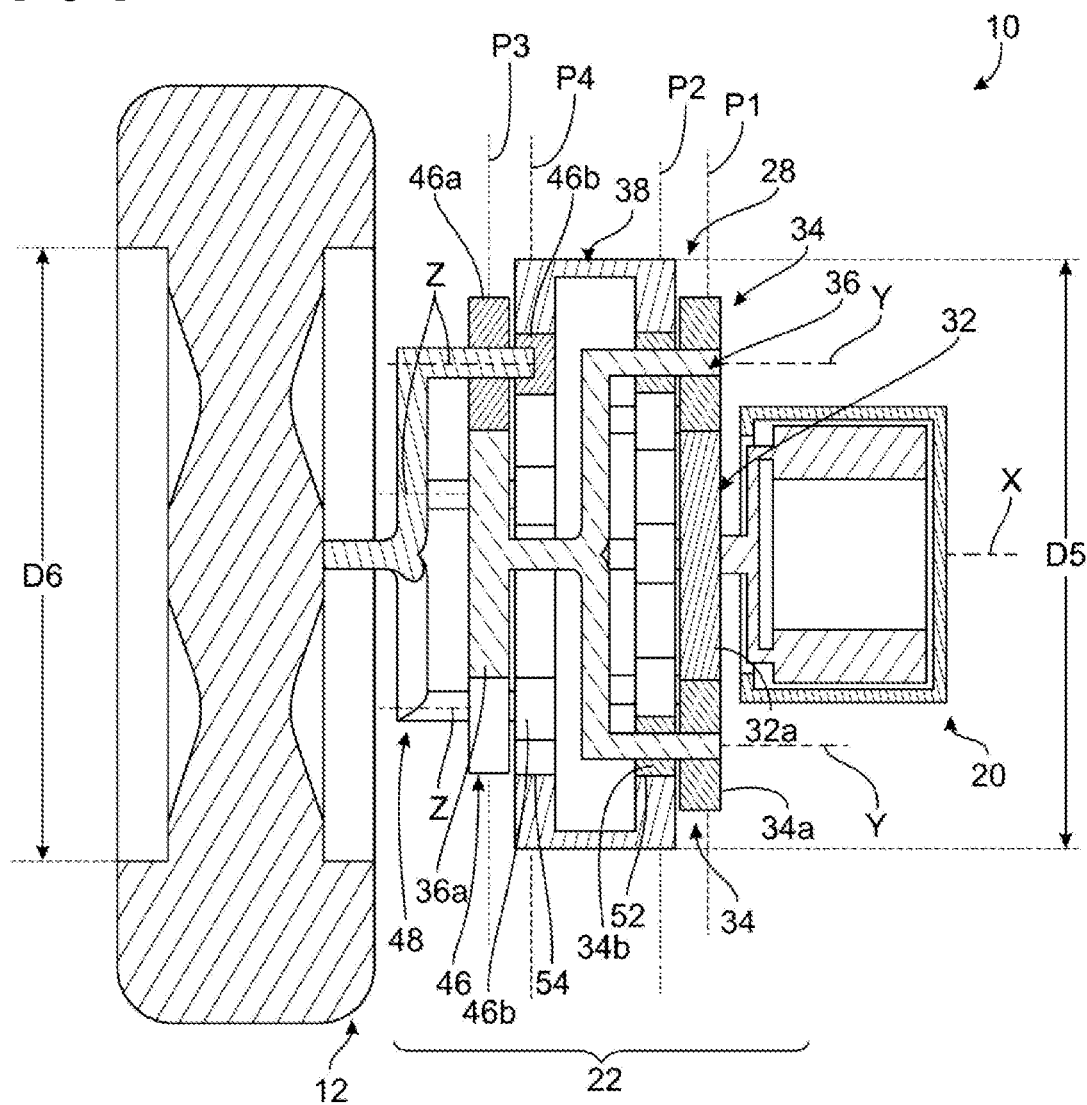

[Fig.7a] 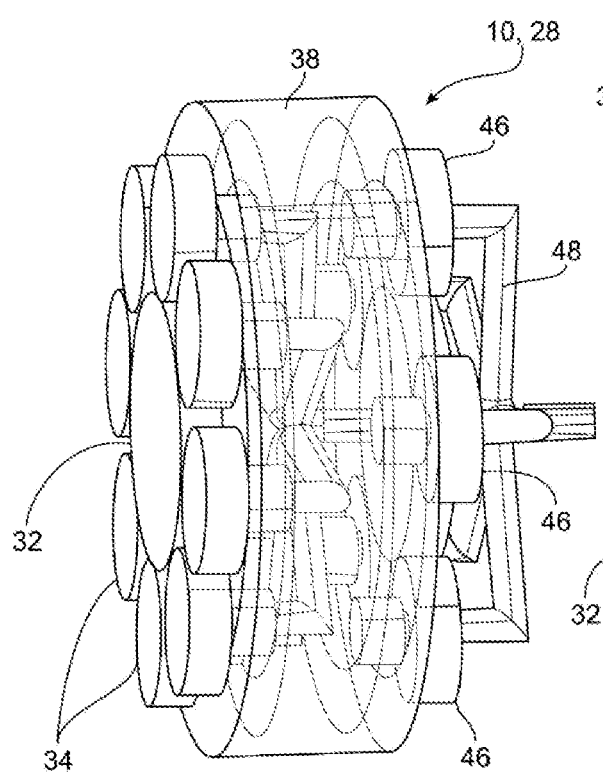
[Fig. 7b] 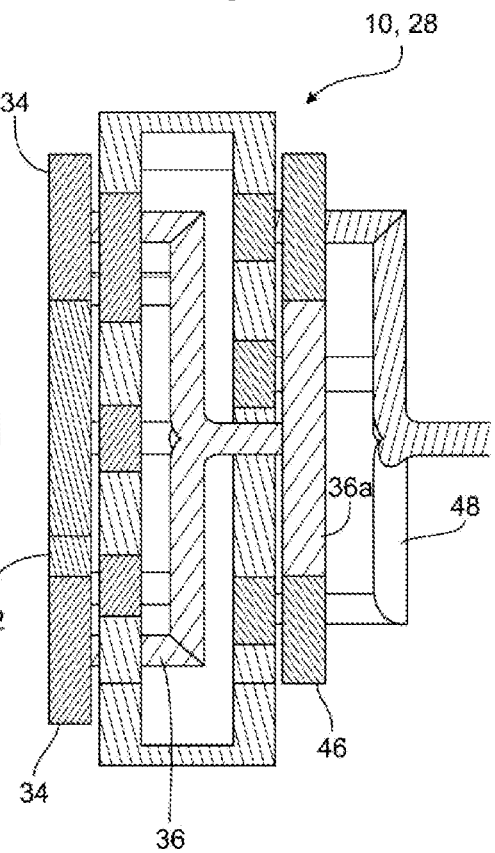

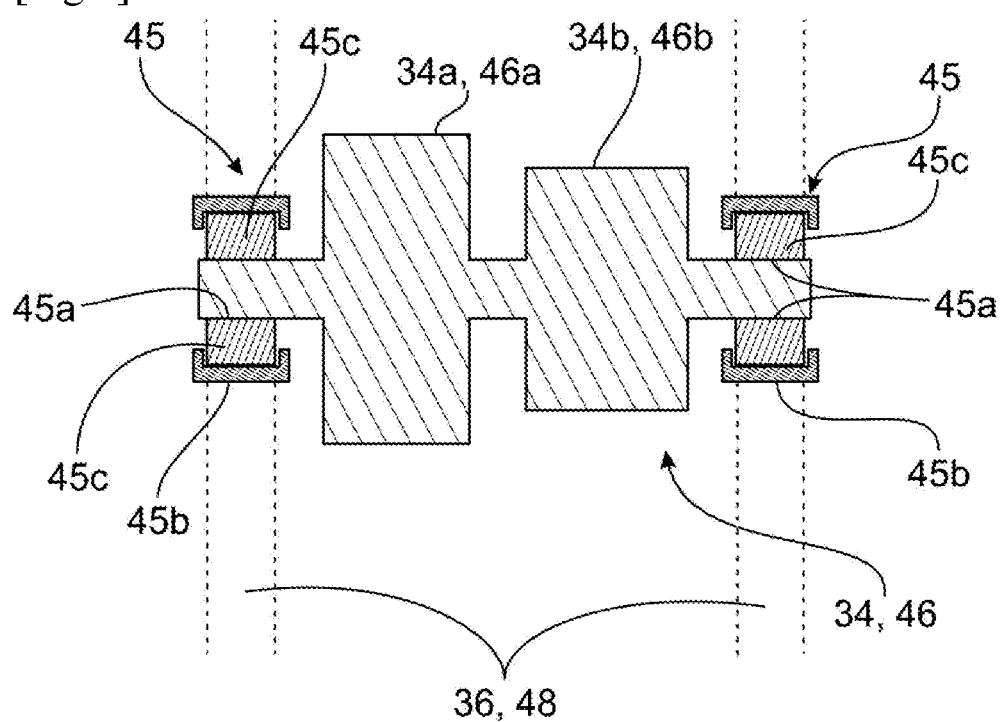
[Fig.8]

[Fig.9]
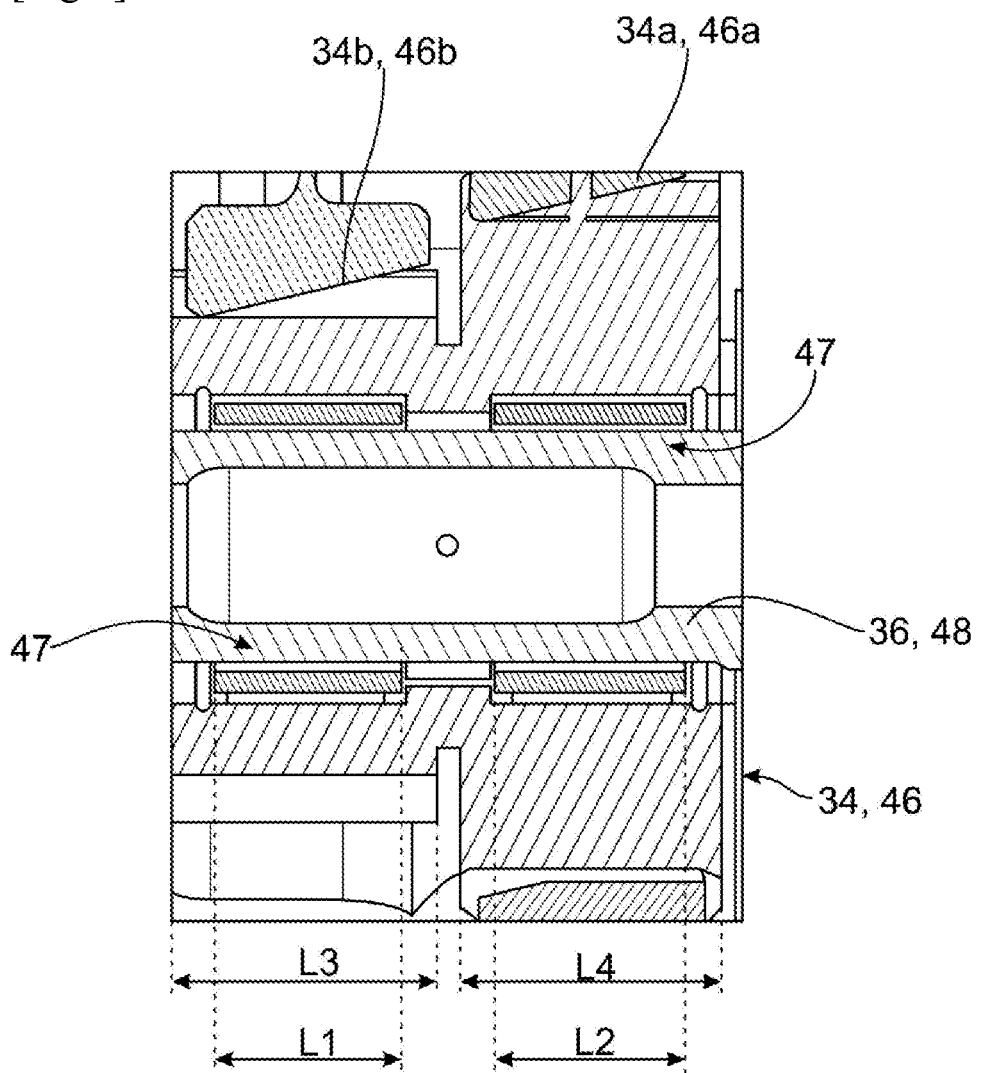

SPEED REDUCER FOR A DEVICE FOR DRIVING A WHEEL OF AN AIRCRAFT LANDING GEAR

TECHNICAL FIELD OF THE INVENTION

This invention relates to a mechanical speed reducer and to a device for driving at least one wheel of an aircraft landing gear comprising such a reducer.

TECHNICAL BACKGROUND

The technical background comprises in particular the documents FR-A1-3 022 858, US-A1-2019/191575 and US-A1-3,711,043.

An aircraft comprises landing gears equipped with wheels for moving the aircraft on the ground over a tarmac. This taxiing can be achieved by propelling the aircraft using its turbomachines.

To limit the fuel consumption and the environmental impact, it is known to carry out this taxiing electrically. The electric taxiing is achieved by driving the wheels of a landing gear by an electric motor.

The present application proposes an improvement on existing technologies and thus relates to an electric motor device for driving at least one wheel of an aircraft landing gear.

A solution consisting of using a mechanical reducer to transmit the power of an electric motor to a wheel of a landing gear was proposed by the Applicant in the document EP-A1-3 882 136.

The role of a mechanical reducer is to modify the speed and torque ratio between the input axle and the output axle of a mechanical system.

In the remote field of the aircraft turbomachines, a mechanical reducer is used to transmit power between two rotating mechanical shafts.

There are many different types of reducers, for example differential, planetary, epicyclic, with intermediate lines, with reduction stages in series, etc.

In the prior art of the dual-flow turbomachines, the reducers are of the planetary or epicyclic type. Such a reducer comprises a central pinion, referred to as sun gear, a ring gear and pinions referred to as planet gears, which are engaged between the sun gear and the ring gear. The planet gears are maintained by a frame referred to as planet carrier. The sun gear, the ring gear and the planet carrier are planetary because their axes of revolution coincide with the longitudinal axis of the turbomachine. The planet gears each have a different axis of revolution equally distributed on the same operating diameter around the axis of the planetaries. These axes are parallel to the longitudinal axis of the turbomachine.

There are several reducer architectures. In other similar applications, there are architectures referred to as differential or "compound".

In a planetary reducer, the planet carrier is stationary and the ring gear is the output shaft of the device which rotates in the opposite orientation of the sun gear.

In an epicyclic reducer, the ring gear is stationary and the planet carrier is the output shaft of the device which rotates in the same orientation as the sun gear.

On a compound reducer, no element is attached in rotation. The ring gear rotates in the opposite orientation of the sun gear and the planet carrier.

The reducers can consist of one or more meshing stages. This meshing is ensured in different ways such as by contact, friction or magnetic field.

In the present application, "stage" or "toothing" means at least one series of meshing teeth with at least one series of complementary teeth. A toothing can be internal or external.

A planet gear may comprise one or two meshing stages. A single-stage planet gear comprises a toothing that can be straight, helical or herringbone, and whose teeth are located on a same diameter. This toothing cooperates with both the sun gear and the ring gear.

A double-stage planet gear comprises two toothings that are located on different diameters. A first toothing cooperates with the sun gear and a second toothing generally cooperates with the ring gear.

A reducer with a meshing double stage has the advantage of having a higher reduction ratio than a reducer with a single meshing stage of the same overall dimensions.

In the context of a device for driving at least one wheel of a landing gear, the use of an electric motor and a reducer to drive the wheel generates considerable overall dimensions constraints. The outer diameter of the reducer is limited by the size of the rim of the wheel, and the inner diameter of the reducer is strongly constrained by the diameter of the hub of the wheel. In addition, the use of an electric motor generally rotating at high speeds requires the use of a reducer with a high reduction ratio in order to offer an output speed that corresponds to the low speed of rotation of the wheel. The current epicyclic and planetary gear trains do not offer these levels of reduction in such a small space.

The invention proposes a solution to at least part of these problems, which is simple, effective and economical.

SUMMARY OF THE INVENTION

The invention relates to a mechanical speed reducer, in particular for a device for driving at least one wheel of an aircraft landing gear, this reducer comprising:
  a first sun gear movable in rotation about an axis X and comprising an external toothing,
  first planet gears distributed around the axis X and meshed with the external toothing of the first sun gear, these first planet gears being movable in rotation around axes Y parallel to the axis X and being carried by a first planet carrier movable in rotation around the axis X,
  a stationary ring gear meshed with the planet gears,
  characterised in that it further comprises:
  second planet gears distributed around the axis X and meshed with a ring gear and with an external toothing of said first planet carrier, these second planet gears being movable in rotation around axes Z parallel to the axis X and being carried by a second planet carrier movable in rotation around the axis X.

The invention proposes a double gear train epicyclic reducer. A first epicyclic gear train is formed by the first sun gear, the first planet gears carried by the first planet carrier and the ring gear. A second epicyclic gear train is formed by the first planet carrier, which forms a second sun gear, the second planet gears carried by the second planet carrier, and the ring gear. We can therefore see that there is one element in common to the two epicyclic gear trains, and that is the first planet carrier for the first gear train and the second sun gear for the second gear train. In practice, this can mean equipping the first planet carrier with an external pinion toothing which are centred on the axis X and which can mesh with the toothings of the second planet gears. The ring gears of the first and second gear trains can be the same or different.

The reducer thus comprises the first sun gear, which forms the input of the reducer, and the second planet carrier, which forms the output of the reducer. The ring gear or ring gears are stationary.

The planet gears are advantageously of the double-stage type and thus comprise independent toothings for meshing with the sun gear and the ring gear. In this case, the reducer is of the double-stage and double epicyclic gear train type.

The reducer according to the invention has a high reduction ratio compared with the reducers of the prior art, thanks to its double epicyclic gear train.

The invention is compatible with a multi-stage reducer as described above. It is also compatible with a reducer where the planet carrier is movable in rotation, such as the epicyclic or differential reducers. It is also compatible with any type of toothings (straight, helical, herringbone, etc.). The invention is further compatible with a planet carrier of the monobloc type or of the cage and cage carrier type. These different types of reducer are well known to those persons skilled in the art. The solution proposed below is compatible with any type of planet gear bearing, whether it consists of rolling elements, a hydrodynamic bearing, etc.

The reducer according to the invention may comprise one or more of the following characteristics, taken alone or in combination with each other:
- the first planet gears each comprise a first external toothing meshed with the external toothing of the first sun gear, and a second external toothing meshed with a first internal toothing of a first ring gear;
- the first and second toothings of each of the first planet gears have different diameters and/or different numbers of teeth;
- the second planet gears each comprise a first external toothing meshed with the external toothing of the first planet carrier;
- the second planet gears each comprise a second external toothing meshed with a second internal toothing of said first ring gear;
- the first and second toothings of each of the second planet gears have different diameters and/or different numbers of teeth;
- the axes Y are located on a first circumference and the axes Z are located on a second circumference, the first and second circumferences having different diameters;
- the axes Y are located on a first circumference and the axes Z are located on a second circumference, the first and second circumferences having identical diameters;
- the number of first planet gears is equal to the number of second planet gears;
- the number of first planet gears is different from the number of second planet gears;
- the toothings of the first and second planet gears are herringbone-shaped and the toothings of the ring gear or ring gears are helical;
- the first and second planet gears are guided in rotation by bearings located at the longitudinal ends of the planet gears or radially inside the toothings of these planet gears.

The present invention also relates to a device for driving at least one wheel of an aircraft landing gear, this device comprising:
- at least one landing gear wheel, this wheel comprising a rim with an axis of rotation,
- an electric motor comprising a shaft,
- a mechanical transmission system between the shaft of the motor and the rim, this mechanical transmission system comprising a mechanical speed reducer as described above.

BRIEF DESCRIPTION OF THE FIGURES

Further characteristics and advantages will be apparent from the following description of a non-limiting embodiment of the invention with reference to the appended drawings in which:

FIG. 1 is a schematic perspective view of a wheel of an aircraft landing gear and a device for driving this wheel, FIG. 2 is a partial axial sectional view of a mechanical reducer, FIG. 3 is another partial axial sectional view of a mechanical reducer, FIG. 4 is a schematic axial sectional view of a reducer according to one embodiment of the invention, FIG. 5 is a schematic axial sectional view of a device for driving a wheel of an aircraft landing gear, this device comprising the reducer of FIG. 4;

FIG. 6 is a schematic view in axial cross-section of a device for driving a wheel of an aircraft landing gear, this device comprising a reducer according to a variant embodiment of the invention, FIGS. 7a and 7b are schematic views, respectively in perspective and transparency on the one hand, and in axial cross-section on the other hand, of another variant embodiment of the reducer according to the invention;

FIG. 8 is a schematic axial sectional view of a planet gear and guide bearings for guiding this planet gear; and FIG. 9 is a schematic axial sectional view of a planet gear and guide bearings for guiding this planet gear.

DETAILED DESCRIPTION OF THE INVENTION

FIG. 1 shows a device 10 for driving at least one wheel 12 of an aircraft landing gear 14.

The wheel 12 comprises a rim 16 with an axis of rotation X. Conventionally, this rim 16 is generally tubular or disc-shaped and carries a tyre 18 on its periphery.

The device 10 comprises an electric motor 20 and a mechanical transmission system 22 between a shaft of the motor 20 and the rim 16 of the wheel 12.

In the example shown, the motor 20 and the system 22 each have a generally annular shape and are centred on the axis X. They are arranged next to each other and the system 22 is installed between the motor 20 and the rim 16. A portion of the system 22, or even a portion of the motor 20, could be housed in the rim 16 to reduce the overall dimensions of the device 10. The motor 20 and the system 22 can be protected by an outer cylindrical cover 26 projecting from one side of the rim 16 or of the tyre 18.

The mechanical transmission system 22 comprises a mechanical speed reducer 28, examples of embodiments of which are shown in FIGS. 2 and 3.

FIG. 2 shows an epicyclic reducer 28. At the input, the reducer 28 is connected to a shaft 30, for example by means of internal splines 32b. The shaft 30 drives a planetary pinion referred to as the sun gear 32. Typically, the sun gear 32 drives a series of pinions referred to as planet gears 34, which are equally spaced on the same diameter around the axis X of rotation of the sun gear 32. This diameter is equal to twice the operating centre distance between the sun gear 32 and the planet gears 34. The number of planet gears 34 is generally defined as between three and seven.

The assembly of the planet gears 34 is held by a frame referred to as planet carrier 36. Each planet gear 34 rotates about its own axis Y and meshes with a ring gear 38.

In the output we have:

In this epicyclic configuration, the assembly of the planet gears 34 drive in rotation the planet carrier 36 about the axis X. The ring gear 38 is attached to a stator via a ring gear carrier 40 and the planet carrier 36 is attached to another shaft 42.

In another planetary configuration, the assembly of the planet gears 34 is held by a planet carrier 36 which is attached to a stator. Each planet gear drives the ring gear 38 which is connected to the shaft 42 via a ring gear carrier 40.

In another differential configuration, the assembly of the planet gears 34 is held by a planet carrier 36 which is connected to the shaft 30. Each planet gear 34 drives the ring gear 38 which is fitted to the shaft 42 via a ring gear carrier 40.

Each planet gear 34 is mounted free in rotation by means of a bearing 44, for example of the rolling or hydrodynamic bearing type. Each bearing 44 is mounted on one of the axles 36b of the planet carrier 36 and all the axles 36b are positioned relative to each other using one or more structural frames 36a of the planet carrier 36. The number of axles 36b and bearings 44 is equal to the number of planet gears 34. For reasons of operation, assembly, manufacture, inspection, repair or replacement, the axles 36b and the frame 36a may be separated into several parts.

For the same reasons mentioned above, the toothing 34a of a planet gear 34 can be separated into several helices or teeth each having a median plane P, P'. In the example shown, each planet gear 34 comprises two series of herringbone teeth cooperating with a ring gear 38 separated into two half-ring gears:

An upstream annulus 38a consisting of a rim 38aa and an attachment half-flange 38ab. On the rim 38aa is the front helix meshed with a helix of the toothing 34a of each planet gear 34. The helix of the toothing 34a also meshes with that of the sun gear 32.

A downstream annulus 38b consisting of a rim 38ba and an attachment half-flange 38bb. The rear helix is located on the rim 38ba and is meshed with a helix of the toothing 34a of each planet gear 34. The helix of the toothing 34a also meshes with that of the sun gear 32.

If the helix widths vary between the sun gear 32, the planet gears 34 and the ring gear 38 because of the toothing overlaps, they are all centred on a median plane P for the upstream teeth and on another median plane P' for the downstream teeth.

FIG. 2 illustrates the case of a reducer with a single meshing stage, i.e., the same toothing 34a of each planet gear 34 cooperates with both the sun gear 32 and the ring gear 38. Although the toothing 34a comprises two sets of teeth, these teeth have the same average diameter and form a single toothing referred to as herringbone.

The attachment half-flange 38ab of the upstream annulus 38a and the attachment half-flange 38bb of the downstream annulus 38b form the attachment flange 38c of the ring gear. The ring gear 38 is attached to the ring gear carrier 40 by assembling the attachment flange 38c of the ring gear 38 and an attachment flange 40a of the ring gear carrier 40 using a bolted assembly, for example.

FIG. 3 shows another example of reducer architecture, referred to as a double meshing stage, in which each planet gear 34 comprises two separate toothings 34a1, 34a2 configured to cooperate respectively with the ring gear 38 and the sun gear 32.

In this FIG. 3, the elements already described in the foregoing are designated by the same references.

The toothing 34a1 meshing with the ring gear 38 has an average diameter D2 and is located in a median plane P. The toothing 34a2 meshing with the sun gear 32 has an average diameter D1 and is located in another median plane P'. The median planes P, P' are parallel to each other and perpendicular to the axis X. The diameter D2 is smaller than the diameter D1. Finally, each toothing 34a1, 34a2 comprises a single helix.

FIG. 4 shows a first embodiment of a mechanical speed reducer 28 according to the invention, which has the particularity of being a double epicyclic gear train.

The reducer 28 comprises:

a first sun gear 32 movable in rotation about an axis X and comprising external toothing 32a, first planet gears 34 distributed around the axis X and meshing with the external toothing 32a of the first sun gear 32, these first planet gears 34 being movable in rotation around axes Y parallel to the axis X and being carried by a first planet carrier 36 movable in rotation around the axis X, and a stationary ring gear 38 meshed with the planet gears 34.

The reducer 28 also comprises:

second planet gears 46 distributed around the axis X and meshed with a ring gear 38 and with an external toothing 36a of the first planet carrier 36, these second planet gears 46 being movable in rotation around axes Z parallel to the axis X and being carried by a second planet carrier 48 movable in rotation around the axis X.

In the example shown, the sun gear 32 comprises a shaft 32c which may be that of the motor 20 or which may be connected to the shaft of the motor 20, and a pinion comprising the external toothing 32a at its external periphery.

The reducer 28 is of the double-stage type, i.e., the first and second planet gears 34, 46 are each of the double-stage type and comprise two independent toothings 34a, 34b, 46a, 46b.

The first planet gears 34 comprise a first toothing 34a meshed with the toothing 32a of the sun gear 32, and a second toothing 34b meshed with a first toothing 52 of the ring gear 38. The first toothing 34a has a larger diameter and/or number of teeth than the second toothing 34b. The toothing 34a is located on the side of the shaft 32c and therefore of the electric motor 20, and the toothing 34b is therefore located on the opposite side, i.e., on the side of the wheel 12.

The first planet carrier 36 comprises or carries physical axles 36b for supporting or guiding the first planet gears 34. The first planet carrier 36 also comprises a shaft 36c or a segment of shaft connected to a pinion comprising the external toothing 36a at its external periphery.

The second planet gears 46 comprise a first toothing 46a meshed with the toothing 36a of the first planet carrier 36 forming a second sun gear, and a second toothing 46b meshed with a second toothing 54 of the ring gear 38. The first toothing 46a has a larger diameter and/or number of teeth than the second toothing 46b. The toothing 46a is located on the side of the wheel 12, and the toothing 46b is therefore located on the opposite side, i.e., on the side of the motor 20.

In the example shown, the internal toothings 52, 54 are carried by a same ring gear 38. Alternatively, they could be carried by different ring gears. The ring gear 38 is stationary and is therefore intended to be attached to a stator of the device 10.

The second planet carrier 48 comprises or carries physical axles 48b for supporting or guiding the second planet gears 46. The second planet carrier 48 also comprises a shaft 46c or a segment of shaft which is intended to be connected to the rim 16 of the wheel 12.

As shown in FIG. 4, the shafts 32c, 36c and 46c are centred and guided in rotation about the axis X by bearings 50.

The axes Y and Z are located respectively on circumferences C1, C2 of the same diameter D3, D4. Alternatively, the diameters D3, D4 of these circumferences C1, C2 could be different.

The toothings 34a, 34b, 32a are of any type, for example herringbone. The toothings 46a, 46b, 36a are of any type and preferably herringbone-shaped. The toothings 52, 54 are preferably helical.

FIG. 5 shows a device 10 for driving a wheel 12 of an aircraft landing gear, comprising the reducer 28 shown in FIG. 4.

The motor 20 of the device 10 comprises a rotor 20a and a stator 20b. The rotor 20a has an annular shape and is connected to the shaft 32c. The stator 20b is annular in shape and extends around the rotor 20a and also on a side of the rotor 20a opposite the reducer 28.

The shaft 46c is connected to the rim 16 of the wheel 12. This connection can be made by a disengagement system 16' which is able to adopt two positions: a first position in which the output shaft of the reducer 28, and in particular the shaft 56c, is coupled to the rim 16 or to the shaft of the rim, and a second position in which this output shaft is uncoupled from the rim 16, which is then freewheeling.

The stator 20b of the motor 20 comprises a rod 20c which is centred on the axis X and extends along the axis X successively through the reducer 28 and the rim 16.

FIG. 6 shows a variant embodiment of a device 10 for driving a wheel 12 of an aircraft landing gear according to the invention.

The above description in relation to FIGS. 4 and 5 applies to the reducer 28 in FIG. 6.

FIG. 6 shows that the toothings 32a and 34a are located in the same plane P1 perpendicular to the axis X. The toothings 34b and 52 are located in the same plane P2 perpendicular to the axis X.

The toothings 46a and 36b are located in the same plane P3 perpendicular to the axis X. The toothings 46b and 54 are located in the same plane P4 perpendicular to the axis X.

The ring gear 38 is positioned between the planes P1 and P3. The ring gear 38 has an external diameter D5 which defines the external diameter of the reducer 28 and which is preferably smaller than the external diameter D6 of the rim 16 so that portion of the reducer 28 can be axially housed in the rim 16.

FIGS. 7a and 7b show another variant embodiment of a device 10 for driving a wheel 12 of an aircraft landing gear according to the invention.

The description given above in relation to FIGS. 4 to 6 applies to the reducer 28 in FIGS. 7a and 7b.

It can be seen that the number of first planet gears 34, here eight, is greater than the number of second planet gears 46, here five.

FIG. 8 shows an example of how the planet gears 34, 46 of the reducer 28 are guided. The planet gears 34, 46 are guided by rolling bearings 45, which in this case are roller bearings. There are two guide bearings 45 for guiding each planet gear 34, 46, mounted around the longitudinal ends of this planet gear, between these ends and the planet carrier 36, 48. Each of the bearings 45 comprises an internal ring 45a carried by the planet gear 34, 46 or integrated into it, and an external ring 45b carried by the planet carrier 34, 48. The rollers 45c are mounted between the rings 45a, 45b.

FIG. 8 shows that the toothings 34a, 46a of the planet gears 34, 46 are located between the bearings 45. This arrangement allows the moments applied to the planet gears 34 by the meshing to be balanced as effectively as possible.

Alternatively, as shown in FIG. 9, the planet gears 34, 46 are guided by needle bearings 47. These bearings 47 are two in number and are mounted radially inside the planet gears 34, 46. Each of the bearings 47 is radially aligned with one of the toothings 34a, 46a of the planet gear 34, 46. This assembly allows to reduce the axial overall dimension.

Each of the bearings 47 may have an axial length or dimension L1, L2 measured along the axis Y or Z, which is at least 80% of the axial length or dimension L3, L4 of the corresponding toothing 34a, 46a.

In yet another variant embodiment not shown, the guide bearings 34, 46 for guiding the planet gears are plain bearings or hydrodynamic bearings.

The reducer 28 as described above offers a high reduction ratio compared with the reducers of the prior art, and has a small overall dimensions, these two parameters being important for the use of this reducer in a device for driving at least one wheel of an aircraft landing gear.

The invention claimed is:

1. A mechanical speed reducer for a device for driving at least one wheel of an aircraft landing gear, this reducer comprising:
   a first sun gear movable in rotation about an axis X and comprising an external toothing,
   first planet gears distributed around the axis X and meshed with the external toothing of the first sun gear, these first planet gears being movable in rotation around axes Y parallel to the axis X and being carried by a first planet carrier movable in rotation around the axis X,
   a stationary ring gear meshed with the planet gears,
   second planet gears distributed around the axis X and meshed with the ring gear and with an external toothing of said first planet carrier, these second planet gears being movable in rotation around axes Z parallel to the axis X and being carried by a second planet carrier movable in rotation around the axis X,
   wherein:
   the first planet gears each comprise a first external toothing meshed with the external toothing of the first sun gear, and a second external toothing meshed with a first internal toothing of the ring gear, the first and second toothings of each of the first planet gears having different diameters and/or different numbers of teeth, and
   the second planet gears each comprise a first external toothing meshed with the external toothing of the first planet carrier, and a second external toothing meshed with a second internal toothing of said ring gear, the first and second toothings of each of the second planet gears having different diameters and/or different numbers of teeth.

2. The reducer according to claim 1, wherein the axes Y are located on a first circumference and the axes Z are located on a second circumference, the first and second circumferences having different diameters.

3. The reducer according to claim 1, wherein the axes Y are located on a first circumference and the axes Z are located on a second circumference, the first and second circumferences having identical diameters.

4. The reducer according to claim 1, wherein the number of first planet gears is equal to the number of second planet gears.

5. The reducer according to claim 1, wherein the number of first planet gears is different from the number of second planet gears.

6. The reducer according to claim 1, wherein the toothings of the first and second planet gears are herringbone-shaped and the toothings of the ring gear are helical.

7. The reducer according to claim 1, wherein the first and second planet gears are guided in rotation by bearings which are located at the longitudinal ends of the planet gears or radially inside the toothings of these planet gears.

8. A device for driving at least one wheel of an aircraft landing gear, this device comprising:
- at least one landing gear wheel, this wheel comprising a rim having an axis of rotation,
- an electric motor comprising a shaft,
- a mechanical transmission system between the shaft of the motor and the rim, this mechanical transmission system comprising a mechanical speed reducer according to claim 1.

* * * * *